US008218220B1

(12) United States Patent
Dodds et al.

(10) Patent No.: US 8,218,220 B1
(45) Date of Patent: Jul. 10, 2012

(54) VARIABLE APERTURE OPTICAL DEVICE HAVING A MICROSHUTTER

(75) Inventors: Robert K. Dodds, Santa Barbara, CA (US); Adam M. Kennedy, Santa Barbara, CA (US); William A. Radford, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 407 days.

(21) Appl. No.: 12/643,361

(22) Filed: Dec. 21, 2009

(51) Int. Cl.
*G02B 26/02* (2006.01)
*G02B 26/00* (2006.01)
*G01J 5/00* (2006.01)

(52) U.S. Cl. .................. 359/230; 359/290; 250/338.1

(58) Field of Classification Search ............. 359/227, 359/229–236, 290; 250/330–334, 336.1, 250/338.1–338.5, 339.01–339.09, 340–342
See application file for complete search history.

(56) References Cited

U.S. PATENT DOCUMENTS

2011/0062335 A1* 3/2011 Franklin .................... 250/338.1

OTHER PUBLICATIONS

Th. Kraus et al., "A Micro Shutter for Applications in Optical and Thermal Detectors," *1997 International Conference on Solid-State Sensors and Actuators*, Jun. 16-19, 1997, 4 pages.
Patrick G. Opdahl et al., "An Investigation Into Compliant Bistable Mechanisms," *Proceedings of DETC '98, 1998 ASME Design Engineering Technical Conferences*, Sep. 13-16, 1998, 10 pages.
Brian D. Jensen, "Identification of Macro-and Micro- Compliant Mechanism Configurations Resulting in Bistable Behavior," *Department of Mechanical Engineering, Brigham Young University*, Aug. 1998, 184 pages.
William B. Scott, "Sandia Expands Envelope of MEMS Devices," *Aviation Week & Space Technology 57, The McGraw-Hill Companies, Inc.*, Jun. 12, 2000, 3 pages.
Alexander S. Kutyrev et al., "Programmable Microshutter Arrays for the JWST NIRSpec: Optical Performance," *IEEE Journal of Selected Topics in Quantum Electronics*, vol. 10, No. 3, May/Jun. 2004, 10 pages.
Grégoire Perregaux et al., "Arrays of Addressable High-Speed Optical Microshutters," *IEEE*, 2001, 4 pages.
S. H. Moseley et al., "Microshutters Arrays for the JWST Near Infrared Spectrograph," *Proceedings of SPIE*, vol. 5487, 2004, 8 pages.
Daniel L. Wilcox et al., Fully Compliant Tensural Bistable Micromechanisms (FTBM), *Journal of Microelectromechanical Systems*, vol. 14, No. 6, Dec. 2005, 13 pages.
John German, "Sandia Microshutters Flying Aboard Tiny NASA Satellites," *Sandia Lab News*, vol. 58, No. 15, Jul. 21, 2006, pp. 1 and 4.
Nahum Gat et al., "Variable Cold Stop for Matching IR Cameras to Multiple f-number Optics," *Infrared Technology and Applications XXXIII, Proc. of SPIE*, vol. 6542, 2007.

* cited by examiner

*Primary Examiner* — William Choi
(74) *Attorney, Agent, or Firm* — Lando & Anastasi, LLP

(57) ABSTRACT

In certain embodiments, a detection device includes a structure having an entrance that permits radiation to enter the structure and a radiation detector operable to detect radiation that enters the structure. The device also includes a microshutter array coupled to the structure and aligned with the entrance, the array comprising a plurality of microshutter cells operable to move between a first position in which that microshutter cell prevents radiation of a first wavelength from passing through a portion of the entrance and a second position in which that microshutter cell permits the radiation of the first wavelength to pass through the portion of the entrance. The device further includes an actuating device operable to define a first entrance pupil having a first f-number by moving a plurality of microshutter cells associated with the first f-number.

39 Claims, 4 Drawing Sheets

VARIABLE APERTURE OPTICAL DEVICE HAVING A MICROSHUTTER

TECHNICAL FIELD OF THE INVENTION

The invention generally relates to optical devices, and more particularly to an optical device with a variable aperture.

BACKGROUND OF THE INVENTION

Optical devices, such as infrared detectors, are useful for many applications, including imaging equipment, surveillance equipment, targeting equipment, and military applications. Certain optical devices may require different aperture sizes to optimally perform different operations.

SUMMARY OF THE INVENTION

In certain embodiments, a detection device includes a structure having an entrance that permits radiation to enter the structure and a radiation detector operable to detect radiation that enters the structure. The device also includes a microshutter array coupled to the structure and aligned with the entrance, the array comprising a plurality of microshutter cells operable to move between a first position in which that microshutter cell prevents radiation of a first wavelength from passing through a portion of the entrance and a second position in which that microshutter cell permits the radiation of the first wavelength to pass through the portion of the entrance. The device further includes an actuating device operable to define a first entrance pupil having a first f-number by moving a plurality of microshutter cells associated with the first f-number.

In certain embodiments, a method for detecting radiation includes defining an entrance pupil having a first f-number by moving a plurality of microshutter cells associated with the first f-number between a first position in which each microshutter cell prevents radiation of a first wavelength from passing through an entrance for detection device, and a second position in which each microshutter cell permits the first wavelength to pass through the portion of the entrance. The method also includes receiving radiation through the entrance pupil and detecting radiation passing through the entrance pupil.

BRIEF DESCRIPTION OF THE DRAWINGS

Reference is now made to the following description taken in conjunction with the accompanying drawings, wherein like reference numbers represent like parts and which.

DETAILED DESCRIPTION OF EXEMPLARY EMBODIMENTS

As described in more detail below, the disclosed optical device provides several advantages over prior systems and methods. For example, certain embodiments provide an optical device that includes a continuously variable aperture provided by a microshutter array, allowing a single optical device, such as a single infrared dewar, to perform multiple functions. Certain embodiments include an optical device having a variable aperture provided by a microshutter array to reduce or eliminate the need for mechanically removing, modifying, exchanging different-size apertures or aperture hardware. Further, certain embodiments include an optical device having a variable-aperture provided by a microshutter array that provides a compact optical device. Certain embodiments provide an optical device having rapid reconfiguration capabilities and reduced power consumption. Further, certain embodiments include an improved optical device that uses electromagnetic fields, rather than mechanically moving parts, to adjust aperture size and thereby provide several advantages, including minimized particulation.

Figure 1:
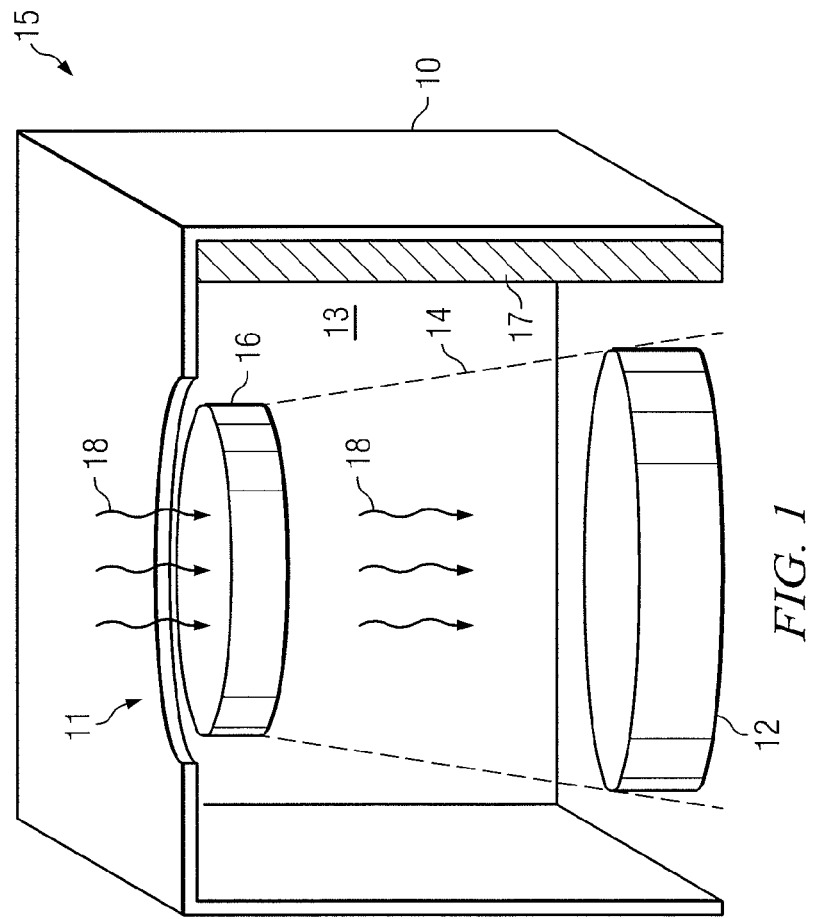
FIG. 1 illustrates one embodiment of an optical device, according to certain embodiments.

FIG. 1 illustrates one embodiment of an optical device 15 comprising a radiation detector 12, a structure 14, and a microshutter array 16 in a vacuum chamber 13 within a housing 10. In certain embodiments, structure 14 is coupled to detector 12 and/or array 16 which may provide radiation and stray light shielding. Housing 10 includes window 11 that allows radiation 18 to reach microshutter array 16. Microshutter array 16 may be configured to provide an entrance pupil or aperture of nearly any size that selectively blocks or reflects certain incoming radiation 18. The proper entrance pupil or aperture size varies based on factors including the wavelength of radiation 16 to be detected and an f-number associated with optical device 15 and its components.

Optical device 15 may also include one or more computers systems with one or more processors, memory, user displays, and input devices. The computer systems may include any suitable hardware or software for using, controlling, monitoring, maintaining, or otherwise operating optical device 15 in any appropriate manner. For example, the illustrated embodiment includes processor 17. Processor 17 may represent or include any form of processing component, including general purpose computers, dedicated microprocessors, or other processing devices capable of processing electronic information. Examples of processor 17 include digital signal processors (DSPs), application-specific integrated circuits (ASICs), field-programmable gate arrays (FPGAs), and any other suitable specific or general purpose processors. Although FIG. 1 illustrates a particular embodiment of optical device 15 that includes a single processor 17, optical device 15 may, in general, include any suitable number of processors 17. Processor 17 and/or other computer systems associated with optical device 15 may be operable to select or specify a target, field of view, lens, f-number, entrance pupil, aperture size, or wavelength associated with optical device 15. These computer systems may also be operable to selectively open, close, and/or hold particular microshutter cells in a microshutter array in particular configurations to provide a variable-size entrance pupil or aperture for optical device 15 based on the selection or determination of such parameters. Such computer systems may also be operable to receive, process, store, and communicate data sent, received, or generated by optical device 15. In certain embodiments, multiple such computer systems may operate together to perform functions associated with optical device 15. Such computer systems may communicate directly or over a network. Computer systems may be located within or outside housing 10 and may be physically and/or electronically coupled to the components of optical device 15 in any suitable manner. In certain embodiments, such computer systems are located outside housing 10 to avoid excess head or radiation load on the components of optical device 15.

Returning to FIG. 1, housing 10 may be any suitable enclosure for the components of optical device 15. In some embodiments, housing 10 provides an environmentally sealed and controlled enclosure for components of optical device 15, including radiation detector 12, structure 14, and microshutter array 16. Housing 10 may comprise any suitable material, such as plastic or metal, and may be any suitable shape, such as tubular or cubic. In certain embodiments, housing 10 may be integrated with structure 14. Housing 10 may include one or more supporting structures for mounting, supporting, coupling, stabilizing, or protecting components of optical device 15, such as radiation detector 12, structure 14, and microshutter array 16. In certain embodiments, housing 10 comprises a dewar for an infrared detector, such as a cryogenically-cooled dewar.

In certain embodiments, housing 10 includes a window 11 that allows radiation 18 to pass into housing 10, reaching other components of optical device 15. Window 11 may be optically aligned with particular components of optical device 15, such as microshutter array 16, to facilitate transmission of radiation 18 to radiation detector 12.

Radiation detector 12 may be any device that detects electromagnetic radiation 18, such as gamma rays, visible light, or infrared radiation. Various embodiments of radiation detector 12 may be configured to detect radiation in any suitable portions of the electromagnetic spectrum. Radiation detector 12 may include any appropriate components for detecting radiation 18, including radiation-sensitive photocells, sensors, one or more lenses, computers, processors, electronics, and other components.

In some embodiments, radiation detector 12 is capable of detecting multiple wavelengths. For example, radiation detector 12 may include an infrared sensor or camera capable of detecting multiple wavelengths of infrared radiation, such as long and short infrared wavelengths. Radiation detector 12 may include a single-color, two-color, or dual band mid-long infrared camera or detector. In addition, radiation detector 12 may be operable to detect shortwave, midwave and/or longwave infrared radiation, such as wavelength ranges associated with nominal wavelengths of 5 microns or 10 microns.

In certain embodiments, radiation detector 12 may include one or more cameras, such as infrared cameras, with multiple lenses. For example, radiation detector 12 may include a two-color infrared camera with one or more wide-angle and telescoping lenses.

Structure 14 defines a distance between radiation detector 12 and microshutter array 16. The distance between radiation detector 12 and microshutter array 16 is related to optical properties of optical device 15, such as the optical f-number and appropriate aperture size, as discussed in more detail below.

In certain embodiments, structure 14 is designed to reduce unwanted radiation (e.g., radiation not emitted from the target object or field) emanating from housing 10 or other components associated with optical device 15 from reaching radiation detector 12. In such embodiments, structure 14 may be any appropriate structure designed to block or otherwise prevent radiation detector 12 from "seeing" undesirable radiation. Structure 14 may comprise any suitable material, including suitable metallic materials, such as aluminum, nickel, or copper, and/or any suitable non-metal materials, or any other material capable of blocking radiation in a particular portion or portions of the electromagnetic spectrum.

As mentioned above, in certain embodiments, radiation detector 12 is an infrared detector with infrared-sensitive photocells. Such photocells are sensitive to thermal infrared radiation emitted by any object at a temperature above absolute zero, including components of optical device 15. Because thermal infrared radiation decreases rapidly as the temperature of an object decreases, operation of radiation detector 12 may be improved by cooling structure 14 to prevent undesirable thermal radiation from reaching radiation detector.

Accordingly, in certain embodiments, structure 14 may comprise a cold shield and/or a cold stop wherein a cooling system is used to maintain structure 14 at a fixed temperature. In some embodiments, structure 14 is cooled to a certain temperature that allows only a negligible amount of stray light radiation to reach radiation detector 12. Moreover, because a fixed temperature may have a known effect on radiation detector 12, that effect can be accounted for and removed when the images are processed.

Similarly, radiation detector 12, microshutter array 16, and other components of optical device 15 may also be cooled to reduce unwanted radiation and improve the radiation sensitivity of optical device 15. For example, structure 14 and/or other components of optical device 15 may be cryogenically cooled to the temperature of radiation detector 12. Any suitable cooling device or method may be used in such embodiments. For example, a thermoelectric cooler, such as a Peltier cooler, may be used to cool structure 14 and other components of optical device 15. Structure 14 and other components of optical device 15 may be integrated into dewars and may include liquid nitrogen or liquid helium, Stirling cryo-generators, Gifford-McMahon mechanical coolers, and other such devices.

Some or all components of optical device 15 may be maintained in a vacuum chamber 13. Within vacuum chamber 13, structure 14, radiation detector 12, and microshutter array 16 may be maintained at a low or cryogenic temperature, based on detector requirements and the desired performance. Vacuum chamber 13 may be a chamber defined by housing 10. Vacuum chamber 13 may advantageously reduce thermal load on cooling systems associated with components of optical device 15.

The performance of optical device 15 varies with several factors, including the target field or image, the desired speed of detection, and wavelength being detected. As mentioned above, radiation detector 12 may have one or more sensors or lenses with different, specific requirements, such as a single-color, two-color, or multi-color (i.e., wavelength range) infrared cameras or other cameras, or detectors with one or more wide-angle or telescoping lenses. For example, certain embodiments include a multiple-wavelength imaging application using a Raytheon single-array dual-wavelength detecting infrared system (MWIR/LWIR). In such embodiments, the wavelengths detectable by radiation detector 12 may vary from approximately 3 μm to 12 μm.

The proper aperture for optical device 15 may vary for different applications. For example, certain applications include detecting different target types, fields of view, and wavelengths, each of which optimally use a different aperture.

Similarly, different applications may be associated with different f-numbers, which is determined in part by aperture size. Accordingly, when applications or characteristics associated with an optical device change, such as when a different lens is used or different wavelength detected, the desirable f-number may change and a previously-used aperture size may no longer be optimal. For example, a system with two operational modes, long-range identification and wide-area search, may optimally require a slow f-number to see longer ranges through a narrow field of view, such as a zoom or telephoto lens, and a fast f-number to detect more targets in a search application using a wide-angle lens. Similarly, infrared detectors capable of detecting both long-wave infrared and mid-wave infrared radiation may require different aperture sizes to provide an appropriate f-number for each mode of operation.

Thus certain optical devices would substantially benefit from the ability to vary aperture size quickly, simply, and inexpensively. For example, self-contained dual-band systems in which there is one detector in a single enclosure would be improved by using a variable aperture.

Accordingly, certain embodiments include microshutter array 16 comprising a plurality of individual microshutter cells that may rotate, pivot, bend or otherwise change position to be selectively opened or closed. Such microshutter cells, when in the closed position, may completely or substantially block or reflect one or more wavelengths of incoming radiation 18. In the open position, such microshutter cells allow one or more wavelengths of incoming radiation 18 to be detected or "seen" by components of optical device 15, such as radiation detector 12. Accordingly, certain ones of the cells in microshutter array 16 may be opened, and others closed, (using, for example, an electromagnetic field, described in more detail below) to provide an aperture that is almost infinitely adjustable. For example, by opening only selected microshutter cells, such as those within a particular radial distance from the center of microshutter array 16, an opening may be formed that functions as an aperture or entrance pupil for optical device 15. In this manner, rather than solely blocking light, microshutter array 16 may function as a variable-diameter entrance pupil or aperture that may be continuously varied and optimized to define or accommodate the optical f-number for the specific target, lens, or wavelength of radiation being detected. Thus certain embodiments provide for the use of interchangeable optics, including interchangeable compound lenses, with a single radiation detector, such as an infrared camera, by providing a microshutter array that can aperture-match the camera to the optics.

For example, in one embodiment radiation detector 12 includes an infrared camera to be used in a wide variety of rapidly-changing target-scene radiation conditions. In such an embodiment, radiation detector 12 may have interchangeable lenses with different f-numbers. When a first lens having a first f-number is used, microshutter array 16 is configured so that particular microshutter cells are closed, and others opened, to define an entrance pupil or aperture of a particular diameter that corresponds with the f-number of the first lens. When the second lens is used, microshutter array 16 is reconfigured to define a different entrance pupil or aperture diameter and that corresponds with the f-number of the second lens. Microshutter array 16 may be reconfigured innumerable additional times, providing a nearly infinite number of entrance pupil or aperture diameters, and in this manner support nearly any desired target, field, lens, or wavelength. Accordingly, microshutter array 16 provides for a continuously variable aperture that can be continuously, and precisely, adjusted as needed, depending on the particular application, the f-number of detector 12 and/or optical device 15, the wavelength of radiation 18, or a focal length associated with radiation detector 12, without mechanical moving parts or physically interchanging apertures.

As an additional example, another embodiment may include a radiation detector 12 having an infrared camera with multiple wide-angle and telescopic lenses. Radiation detector 12 may be located within structure 14 comprising a cold plate that substantially blocks infrared radiation emitted by optical device 15 and other non-target objects. Microshutter array 16 is mounted on structure 14 and provides a variable-diameter entrance pupil or aperture to match the f-numbers for each lens of radiation detector 12. Microshutter array 16, structure 14, radiation detector 12, and their respective components, are cryogenically cooled and enclosed in vacuum chamber 13 within housing 10. Infrared radiation emanating from a target field passes through window 11 to microshutter array 16. Microshutter array 16 is configured to selectively open and close certain microshutter cells, forming an aperture or entrance pupil of a specified diameter based on the optimal f-number for the particular lens or optics being used. Once the microshutter array is configured to the proper entrance pupil or aperture diameter, unblocked radiation 18 is detected and imaged by radiation detector 12.

Although not pictured in FIG. 1, microshutter array 16 and/or optical device 15 further includes any appropriate electronic, magnetic, and/or mechanical components for operating and controlling the microshutter cells associated with the array. For example, certain embodiments include electronic, magnetic, and/or mechanical components for opening, closing, and maintaining the position of microshutter cells. In particular, certain embodiments include components operable to actuate individual or groups of microshutter cells using electro-magnets. Other embodiments may include components operable to actuate individual or groups microshutter cells by sweeping a magnet over the cells. In some embodiments, an electromagnet may be integrated in the wafer on which individual microshutter cells are formed to build series of electro-magnets actuated by a voltage In some embodiments, a strip comprising two or more materials with different thermal expansion rates, such as a bi-metallic strip, may be coupled to a cell and used to actuate individual or groups of microshutter cells. For instance, a current may be applied to such strips to cause a temperature delta (and corresponding material expansion) that bends the strip, thereby actuating an individual or group of microshutter cells. Suitable components for operating the components of microshutter array 16 may be located in or near to microshutter array 16, or may alternatively be located in any suitable location within housing 10, or outside housing 10.

Microshutter array 16 may be coupled to or mounted on structure 14 in any appropriate manner to provide an entrance pupil or aperture for optical device 15. Alternatively, microshutter array 16 may be coupled to or mounted on any other suitable structure associated with optical device 15, such as housing 10 or window 11.

Figure 2:
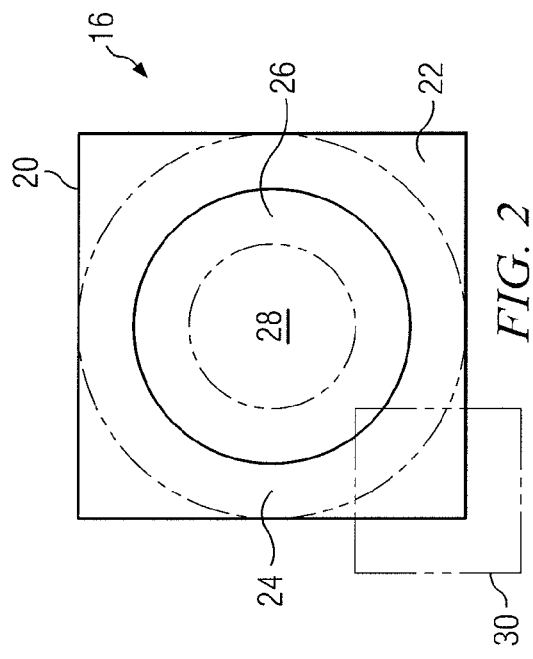
FIG. 2 illustrates an embodiment of microshutter array, according to certain embodiments.

FIG. 2 illustrates an embodiment of microshutter array 16. Microshutter array 16 includes an aperture housing 20 and a plurality of individual microshutters 22. Microshutters 22s may be opened or closed individually or in groups to provide nearly any shape or size opening. In particular, FIG. 2 illustrates three entrance pupils or apertures 24, 26, and 28, each having different diameters, that can be provided by the same microshutter array 16. Similarly, nearly any other diameter entrance pupil or aperture may be provided by microshutter array 16.

Figure 3:
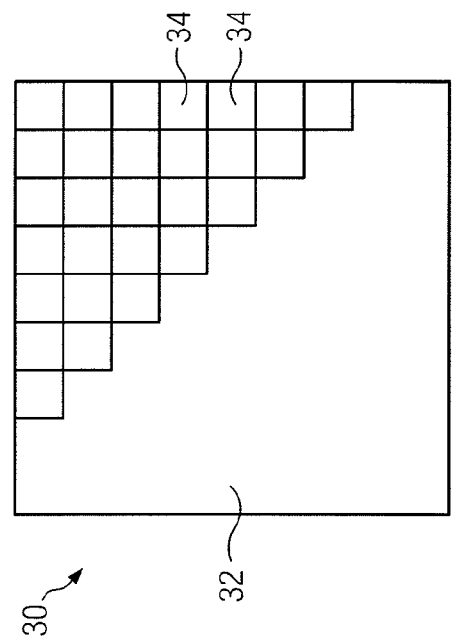
FIG. 3 illustrates a more detailed view a microshutter array, according to certain embodiments.

FIG. 3 illustrates a more detailed view of a portion of microshutter array 16, according to certain embodiments. As stated above, microshutters 22 comprise a plurality of microshutter cells. Closed microshutter cells 32 substantially block or reflect one or more wavelengths of incoming radiation. Open microshutter cells 34 allow one or more wavelengths of incoming radiation to reach a radiation detector. In certain embodiments, open microshutter cells 34 allow substantially all incoming radiation to reach a radiation detector with little or no interference. In certain embodiments, microshutter cells are coated to filter, block, or transmit a selected range of wavelengths. Depending on the desired aperture size and/or f-number, different numbers, groups, or regions of microshutter cells may be selectively opened or closed. As can be seen in FIG. 3, in certain embodiments, the edge of an entrance pupil or aperture provided by microshutter array 16 may comprise a digital "line" of small, square shutters.

Figure 4:
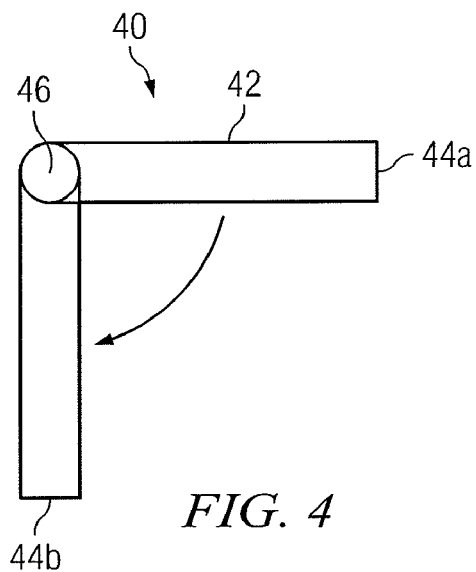
FIG. 4 illustrates the movement of a microshutter cell, according to certain embodiments.

FIG. 4 illustrates movement of microshutter cell 40 according to certain embodiments. Microshutter cell 40 comprises a shutter 42 and hinge 46. Shutter 42 is designed to pivot or bend approximately 90° about hinge 46 as it moves from a first position 44a to a second position 44b. In this manner, shutter 42 may be moved to "open" or "shut" a particular microshutter cell 40.

In certain embodiments, each shutter 42 comprises silicon nitride and has magnetic material, such as iron-cobalt, deposited on it. Shutter 42 is supported on hinge 46 comprising silicon nitride. Motion of shutter 42 may be induced using electro-magnets, including micro-electromagnets or macro-electromagnets, which advantageously eliminate moving parts. Shutter 42 may be actuated using mechanical magnet swept over microshutter cells 40, or an electromagnet may be integrated in the wafer on which shutter 42 is formed to build series of electro-magnets. Shutter 42 may alternatively be actuated in any other suitable manner. For instance, shutter 42 may be actuated using a temperature-responsive properties of multi-material strip (e.g., a bi-metallic strip) coupled to shutter 42, as described above.

In some embodiments, the "natural" position for shutter 42 is closed, and the open position can be electrostatically held with a specific voltage. In such embodiments, shutter 42 may not be a true bi-stable mechanism, as power may be supplied to shutter 42 to maintain the open position. Alternatively, a micro-electro-mechanical system (MEMS) based mechanical method may be used to latch shutters 42 in an open position. Such embodiments may advantageously consume less power and may be preferable for low-power tactical applications.

In certain embodiments, shutter 42, in a closed position, does not reflect or absorb 100% of the incoming radiation, but merely impedes radiation to some degree to provide a contrast with unblocked radiation. In other embodiments, shutter 42, in a closed position, may block substantially incoming radiation. In some embodiments, shutter 42 may be coated in opaque or reflective material to improve radiation blocking. For example, shutter 42 may be coated with one or more suitable materials (e.g., germanium, zinc-selenide) to provide filtering, blocking, and/or transmission of selective wavelengths of radiation.

In certain embodiments, shutter 42 is rectangular in shape, with unit lengths of approximately 100-200 μm. In other embodiments, shutter 42 may be smaller, and may correspond to a pixel in associated optical imaging systems. Smaller unit cells may provide an optically "smoother" digital aperture edge than larger cells, allowing the micro-shutter to be used closer to the detector, and therefore could be inserted into additional applications.

Figure 5:
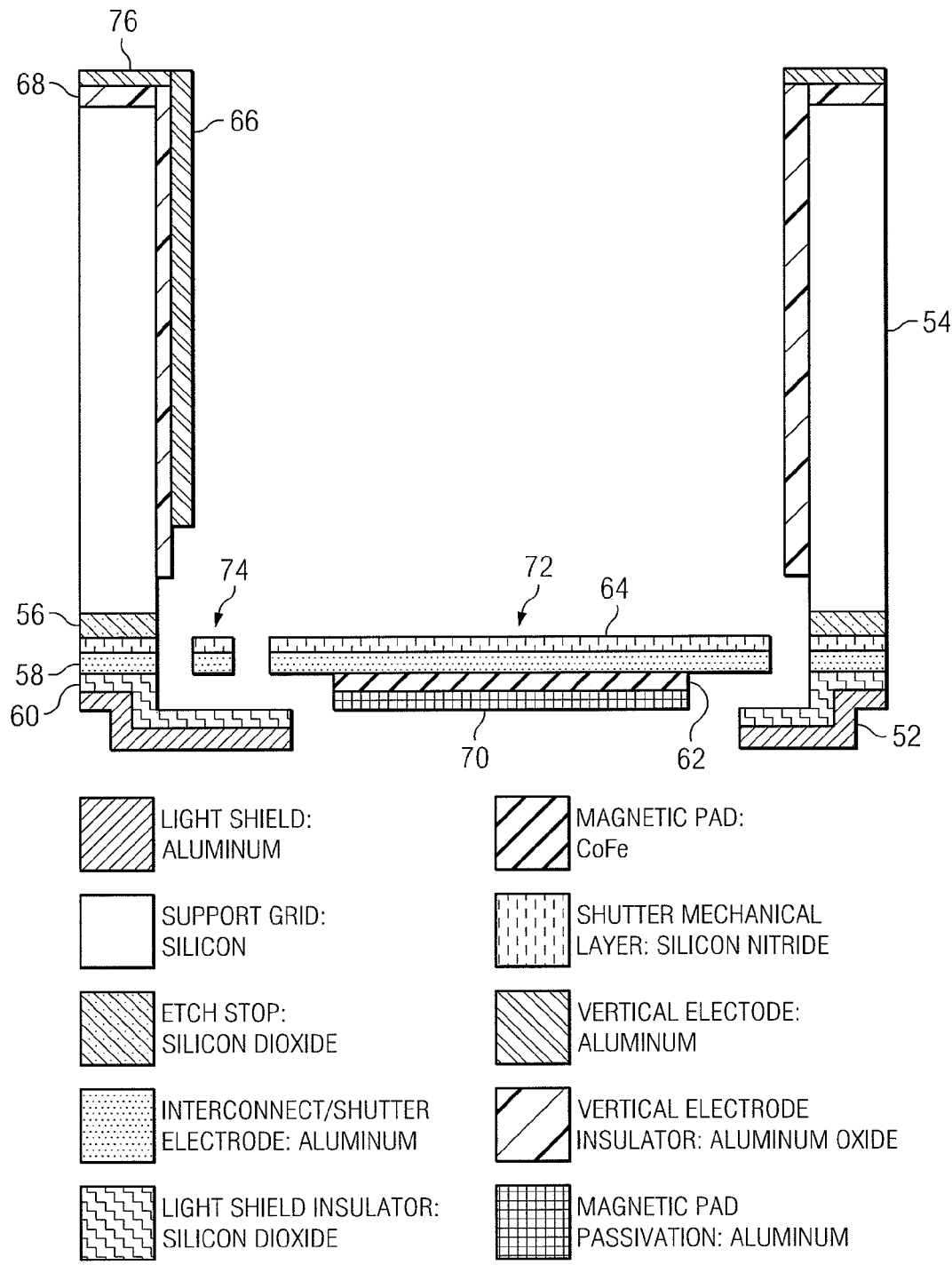
FIG. 5 illustrates a more detailed view of a microshutter cell, according to certain embodiments.

FIG. 5 illustrates in more detail one embodiment of a microshutter cell 40. In particular, FIG. 5 depicts a schematic cross-section of one embodiment of a single microshutter cell 40. Microshutter cell 40 as depicted in FIG. 5 is suitable for use in a microshutter array comprising four 175×384 arrays of individually-operable microshutter cells 40, though other embodiments may include more or fewer sub-arrays of individual cells as appropriate. Key elements in this embodiment include an aluminum light shield 52, a silicon support grid 54, an silicon dioxide etch stop 56, an aluminum shutter electrode 58, a cobalt-iron magnetic pad 62, a silicon nitride shutter mechanical layer 64, an aluminum vertical electrode 66, an aluminum oxide vertical electrode insulator 68, and an aluminum magnetic pad 70.

More specifically, an approximately 100 μm thick silicon grid 54 with approximately 7 μm wide walls supports shutter 72. Shutter 72 is connected to grid 54 via torsion bar 74, which is made of silicon nitride. Shutter 72 is metalized to provide both optical opacity and electrical conductivity. Stripes of a highly permeable material, such as cobalt-iron, allow shutter 72 to be opened to 90°, against vertical electrode 66, using a scanning magnet. Electrical connections are made to shutter blade 72 on the front side of the wafer and vertical electrode 66 on the support structure wall 76. Cantilevered shields minimize radiation leakage in the closed position, providing high open/closed contrast for shutters 72. Each unit cell is approximately 100 μm×200 μm.

Because a magnetically permeable material is deposited on shutters 72, a set of shutters 72 may be opened by scanning a magnet across the array and then latched electrostatically in the open position. In one embodiment, a tripole magnetic field may be used, so that as it scans across, the shutter experiences a magnetic field which rotates through 180° during the scan, rotating it into contact with the wall of the support frame, where it can be electrostatically captured to the vertical electrode with a reasonably low voltage.

After configuring the array, shutters 72 may be held open by an electrostatic field created by the voltage difference between shutter 72 and vertical electrode 66. For a microshutter array, vertical electrodes 66 are connected to rows of the array, while shutters 72 are connected to the columns. During actuation and capture of shutters 72, a positive voltage is applied to shutters 72, and an equal negative voltage applied to vertical electrodes 66. The voltages are chosen so that after capture, either the row voltage or the column voltage is sufficient to hold shutter 72 open. If this is the case, shutter 72 will only be released if the row voltage and the column voltage are set to zero. In this manner, each shutter 72 in the microshutter array can be individually released as required without any active electronic elements on the array. In such an embodiment, all shutters can be individually controlled using an external crosspoint address scheme.

For example, in one embodiment, shutter selection may begin with all shutters closed. The voltage on all rows (vertical electrodes 66) is set to approximately −30 V and on all columns (shutters 72) to approximately +30 V. When a magnet is scanned across the microshutter array, shutters 72 are rotated against vertical electrodes 66 and captured by the electrostatic field between shutter 72 and vertical electrode 66. Next, shutters 72 on the top row that are required to be closed are released and the row is grounded. All shutters 72 on columns with +30 V bias remain captured (open), but those which are grounded are released. Also, all shutters 72 on the grounded column whose vertical electrode is set to −30 V are held. Only those where both row and column are grounded are released. In this manner, all shutters 72 can be individually released, allowing an arbitrary pattern to be generated. After the pattern has been produced, the rows and columns are set to their original voltages to securely hold the pattern.

Figure 6:
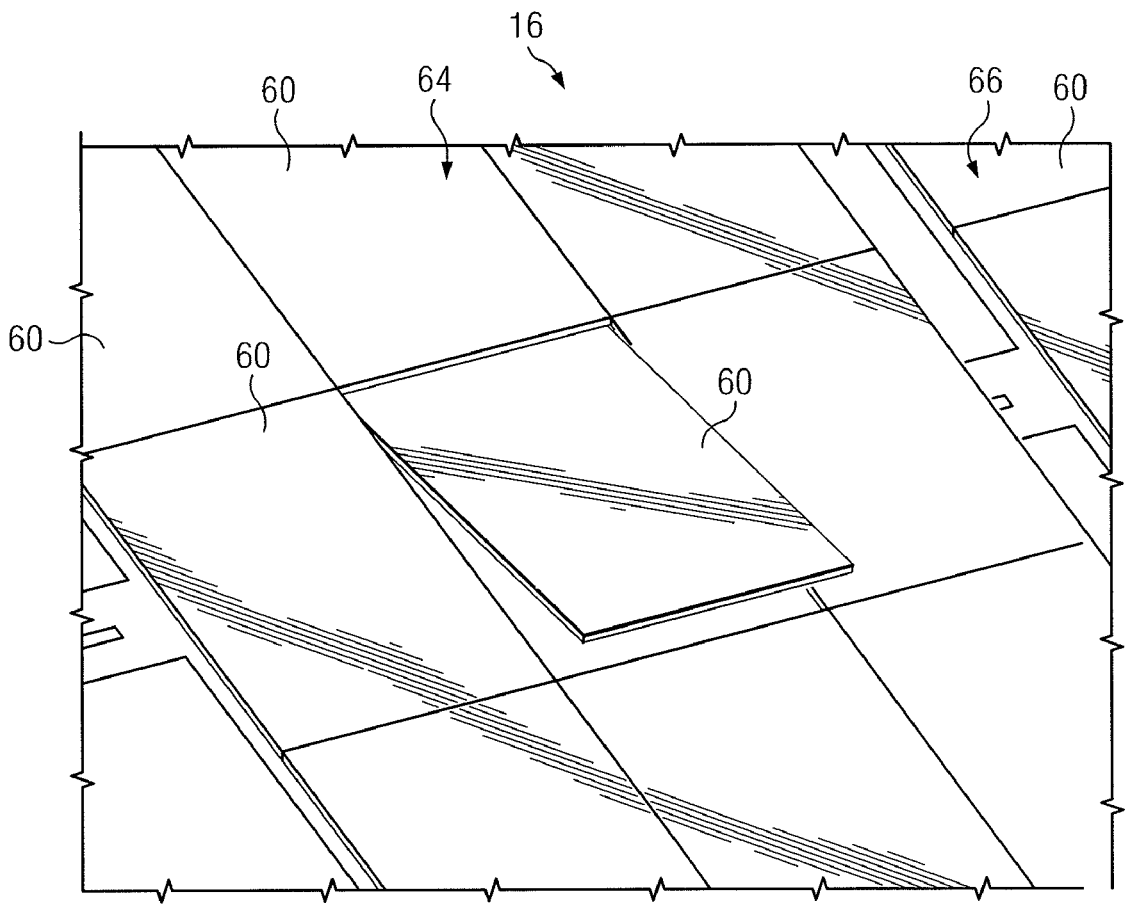
FIG. 6 illustrates another view of a microshutter array, according to certain embodiments.
Figure 7:
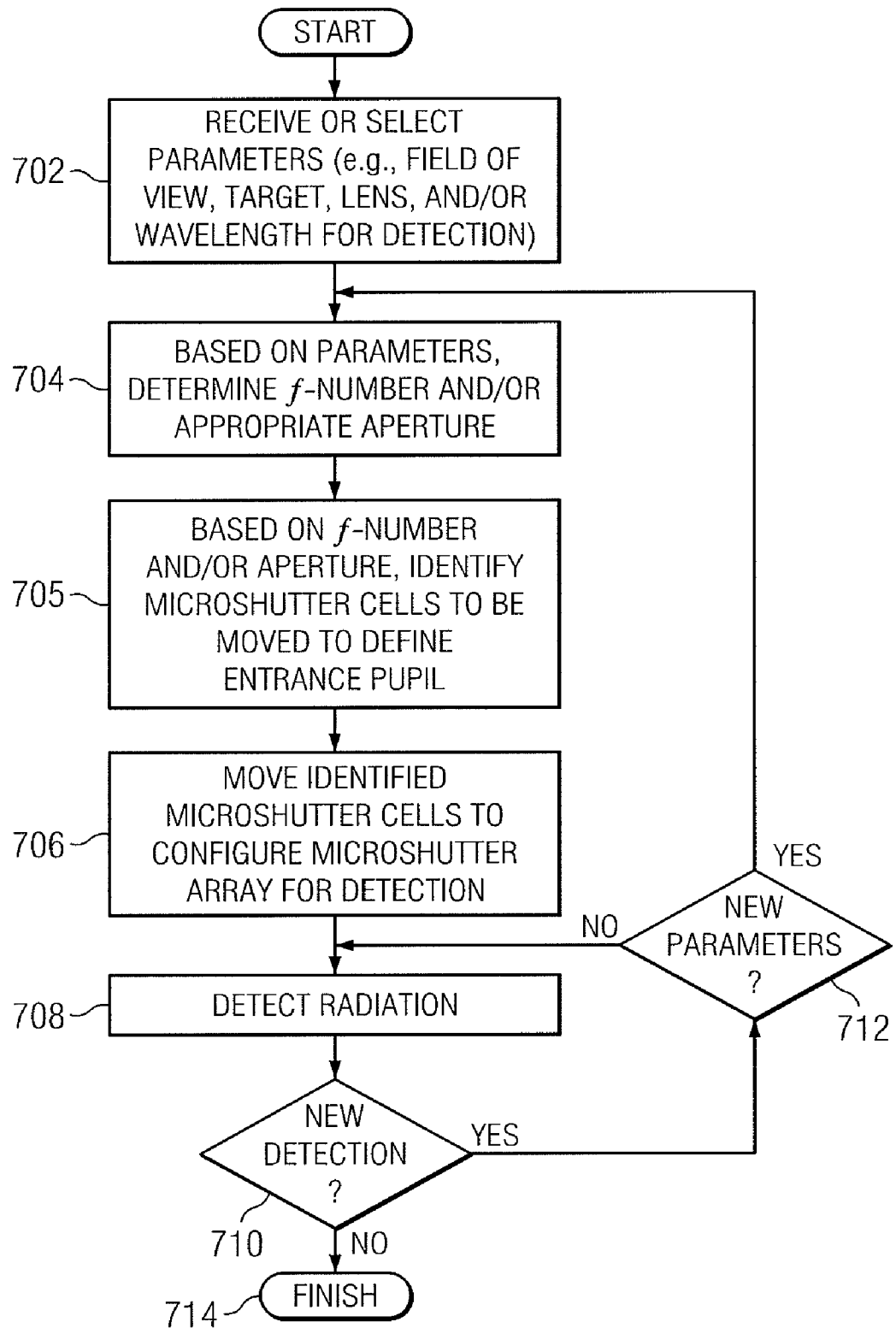
FIG. 7 illustrates steps associated with using an optical device, according to certain embodiments.

FIGS. 6 and 7 illustrate closer views of certain embodiments of microshutter array 16. In particular, FIG. 6 illustrates a microshutter array 16 having a plurality of individual microshutters 60. Individual microshutters 60 may be opened, allowing radiation to pass through. Microshutters in the closed position reflect or block incoming radiation. Microshutters 60 may include a reflective coating to improve operation of array 16. FIG. 6 also illustrates that array 16 may comprise one or more sub-arrays 64 and 66, each comprising a plurality of individual microshutters 60.

FIG. 7 is a flowchart describing the operation of optical device 15 according to certain embodiments. At step 702, parameters are selected, identified, or received for a detection. Parameters may include a field of view, target, lens, and/or wavelength to be detected for the detection. Such selection may be made manually or by a computer, based on any suitable data, instructions, computer program, etc. At step 704, the f-number and/or appropriate aperture size for a detection. The f-number and/or appropriate aperture size e may be determined based on the parameters in step 702. Typically, a computer system (including a processor) will determine the appropriate aperture size and/or f-number based on parameters, data, and/or instructions stored in memory. At step 705, microshutter cells to be moved are identified based on the f-number and/or aperture size. In certain embodiments, a selected number or subset of microshutter cells in the array may be identified to be opened and/or closed to define an entrance pupil for the detection. Some, all, or none of the microshutter cells may be identified for a particular detection, depending on the f-number and/or aperture size needed. At step 706, the microshutter array is adjusted for the detection. For instance, the subset of microshutter cells identified at step 705 may be opened and/or closed as appropriate to define an entrance pupil. In some embodiments, individual microshutter cells will be selectively closed and opened to provide a proper aperture for the detection. At step 708, radiation permitted to pass through the microshutter array as configured in step 706 is detected by the optical device, such as any suitable detection device. The optical device may send or otherwise transmit data associated with the detection to a computer system, where it may be stored in memory, including image data and other information. At step 710, it is determined if there will be another detection by the optical device. If not, the process is finished at step 714. If another detection is requested or ordered, at step 712 it is determined if the new detection involves different parameters, such as a different field of view, target, lens, and/or wavelength. If not, the existing microshutter array configuration (and corresponding f-number and/or aperture size) may be appropriate and step 708 follows. If so, step 704 follows and a new f-number and/or aperture size are determined for the new detection.

Although various embodiments have been described above, numerous alterations may be made to the disclosed embodiments without departing from the scope of the invention.

What is claimed is:

1. A detection device, comprising:
   a structure comprising an entrance that permits radiation to enter the structure;
   a radiation detector operable to detect radiation that enters the structure;
   a microshutter array coupled to the structure and aligned with the entrance, the array comprising a plurality of microshutter cells, wherein each microshutter cell is operable to move between a first position in which that microshutter cell prevents radiation of a at least a first wavelength from passing through a portion of the entrance and a second position in which that microshutter cell permits the radiation of at least the first wavelength to pass through the portion of the entrance; and
   an actuating device operable to define a first entrance pupil having a first f-number by moving a plurality of microshutter cells associated with the first f-number between positions.

2. The detection device of claim 1, wherein the actuating device comprises a magnet.

3. The detection device of claim 1, wherein moving the plurality of microshutter cells comprises generating an electromagnetic field affecting the microshutter cells.

4. The detection device of claim 1, wherein the actuating device comprises one or more bi-metallic strips.

5. The detection device of claim 1, wherein the structure, radiation detector, and microshutter array are enclosed in a vacuum chamber.

6. The detection device of claim 1, wherein the structure is cryogenically cooled.

7. The detection device of claim 1, wherein the structure is a radiation shield.

8. The detection device of claim 1, further comprising:
   a housing at least partially enclosing the structure and the radiation detector, the housing including a window aligned with the entrance.

9. The detection device of claim 1, wherein the radiation detector comprises an infrared camera capable of detecting near-infrared and far-infrared wavelengths.

10. The detection device of claim 1, wherein the radiation detector comprises a plurality of lenses.

11. The detection device of claim 1, wherein the microshutter cells are coated to filter, block, or transmit a selected range of wavelengths.

12. The detection device of claim 1, wherein each microshutter cell prevents radiation of a at least the first wavelength from passing through a portion of the entrance by blocking substantially all wavelengths.

13. The detection device of claim 1, further comprising:
   a processor operable to:
      receive a parameter associated with a detection;
      based on the parameter, determine an f-number associated with the detection; and
      instruct the actuating device to move a plurality of microshutter cells associated with the determined f-number.

14. The detection device of claim 13, wherein the parameter identifies selection of a lens.

15. The detection device of claim 13, wherein the parameter identifies selection of a range of wavelengths for detection.

16. A method for detecting radiation, comprising:
   defining an entrance pupil having a first f-number by moving a plurality of microshutter cells associated with the first f-number between a first position in which each microshutter cell prevents radiation of at least a first wavelength from passing through an entrance for detection device, and a second position in which each microshutter cell permits radiation of at least the first wavelength to pass through the portion of the entrance;
   receiving radiation through the entrance pupil; and
   detecting radiation passing through the entrance pupil.

17. The method of claim 16, wherein the plurality of microshutter cells is moved by a magnet.

18. The method of claim 16, wherein the plurality of microshutter cells is moved by a generating an electromagnetic field.

19. The method of claim 16, wherein the plurality of microshutter cells is moved using one or more bi-metallic strips.

20. The method of claim 16, wherein the steps of defining an entrance pupil and detecting radiation are performed in a vacuum chamber.

21. The method of claim 16, wherein the radiation is detected using an infrared camera operable to detect near-infrared and far-infrared wavelengths.

22. The method of claim 16, wherein the radiation is detected by a device comprising a plurality of lenses.

23. The method of claim 16, wherein the microshutter cells are coated to filter, block, or transmit a selected range of wavelengths.

24. The method of claim 16, wherein each microshutter cell prevents radiation of a at least the first wavelength from passing through a portion of the entrance by blocking substantially all wavelengths.

25. The method of claim 16, further comprising:
receiving a parameter associated with a detection;
determining an f-number associated with the detection, based on the parameter; and
instructing an actuating device to move a plurality of microshutter cells associated with the determined f-number.

26. The method of claim 25, wherein the parameter identifies a lens.

27. The method of claim 25, wherein the parameter identifies a range of wavelengths for detection.

28. A device for detecting radiation, comprising:
means for defining an entrance pupil having a first f-number by moving a plurality of microshutter cells associated with the first f-number between a first position in which each microshutter cell prevents radiation of at least a first wavelength from passing through an entrance for detection device, and a second position in which each microshutter cell permits at least the first wavelength to pass through the portion of the entrance;
means for receiving radiation through the entrance pupil; and
means for detecting radiation passing through the entrance pupil.

29. The device of claim 28, wherein the plurality of microshutter cells are moved by a magnet.

30. The device of claim 28, wherein the plurality of microshutter cells are moved by a generating an electromagnetic field.

31. The device of claim 28, wherein the plurality of microshutter cells are moved using one or more bi-metallic strips.

32. The device of claim 28, wherein the means for defining an entrance pupil and the means for detecting the portion of radiation are enclosed in a vacuum chamber.

33. The device of claim 28, wherein the radiation is detected using an infrared camera operable to detect near-infrared and far-infrared wavelengths.

34. The device of claim 28, wherein the radiation is detected by a device comprising a plurality of lenses.

35. The device of claim 28, wherein the microshutter cells are coated to filter, block, or transmit a selected range of wavelengths.

36. The method of claim 28, wherein each microshutter cell prevents radiation of a at least the first wavelength from passing through a portion of the entrance by blocking substantially all wavelengths.

37. The device of claim 28, further comprising:
means for receiving a parameter associated with a detection;
means for determining an f-number associated with the detection, based on the parameter; and
means for instructing an actuating device to move a plurality of microshutter cells associated with the determined f-number.

38. The device of claim 37, wherein the parameter identifies a lens.

39. The device of claim 37, wherein the parameter identifies a range of wavelengths for detection.

* * * * *

UNITED STATES PATENT AND TRADEMARK OFFICE
CERTIFICATE OF CORRECTION

| | | |
|---|---|---|
| PATENT NO. | : 8,218,220 B1 | Page 1 of 1 |
| APPLICATION NO. | : 12/643361 | |
| DATED | : July 10, 2012 | |
| INVENTOR(S) | : Robert K. Dodds et al. | |

It is certified that error appears in the above-identified patent and that said Letters Patent is hereby corrected as shown below:

In column 9, line 59, "a at least" should be replaced with --at least--.

Signed and Sealed this
Sixteenth Day of October, 2012

David J. Kappos
*Director of the United States Patent and Trademark Office*